United States Patent [19]

Johnson

[11] Patent Number: 5,284,038
[45] Date of Patent: Feb. 8, 1994

[54] COUPLER LOCKING DEVICE

[76] Inventor: Clyde T. Johnson, P.O. Drawer 100, Escanaba, Mich. 49829

[21] Appl. No.: 592,130

[22] Filed: Oct. 3, 1990

[51] Int. Cl.$^5$ ............................................. F16B 41/00
[52] U.S. Cl. ..................................... 70/232; 280/507
[58] Field of Search ................... 70/229, 232, 34, 230; 411/417, 418, 910, 432; 280/507

[56] References Cited

U.S. PATENT DOCUMENTS

| | | | |
|---|---|---|---|
| 1,430,837 | 10/1922 | Oakes | 70/232 |
| 1,438,574 | 12/1922 | Briggs | 70/232 |
| 1,444,214 | 2/1923 | Schultz . | |
| 1,491,691 | 4/1924 | Godshalk . | |
| 1,554,958 | 9/1925 | Falk | 70/232 |
| 1,782,584 | 11/1930 | Ryan | 70/232 |
| 1,828,658 | 10/1931 | Henke, Jr. . | |
| 1,921,225 | 8/1933 | Hawkins | 70/232 |
| 1,971,797 | 8/1934 | Shinn | 70/32 |
| 2,999,377 | 12/1961 | Raye . | |
| 3,139,291 | 6/1964 | Geresy . | |
| 3,605,457 | 9/1971 | Foster . | |
| 4,428,211 | 1/1984 | Hermann | 70/34 |
| 4,619,122 | 10/1986 | Simpson | 70/34 |
| 4,637,234 | 1/1987 | Mielonen | 70/34 |
| 4,711,106 | 12/1987 | Johnson | 70/34 |

FOREIGN PATENT DOCUMENTS 965297 2/1950 France .......................... 70/232
2199387 7/1988 United Kingdom ................ 70/232

OTHER PUBLICATIONS

Distributor Net Price Schedule Dead-Bolt Spare Tire Lock, published by C. T. Johnson Enterprises, Inc., Jul. 1, 1988.

Primary Examiner—Lloyd A. Gall
Attorney, Agent, or Firm—Foley & Lardner

[57] ABSTRACT

A locking device includes a threaded stud with a flat face cut through the threaded surface parallel to the axial direction of the stud, and a knob which locks over a forward section of the stud and includes a casing having an inner surface which defines a hole extending axially through the casing. The inner surface of the casing has a flat surface extending axially which receives the corresponding flat face on the threaded stud to prevent rotation of the casing with respect to the stud. The knob also includes a tumbler housing which is mounted in an axially-fixed position within the casing to rotate freely when a key is inserted into the tumbler housing, and to remain locked in a fixed position when the key is withdrawn. Fitted into the rearward end of the tumbler housing is a sleeve having a threaded axial hole which engages the threaded stud when the tumbler housing is turned by a key to thereby pull the forward section of the stud into the casing hole.

16 Claims, 2 Drawing Sheets

COUPLER LOCKING DEVICE

FIELD OF THE INVENTION

The present invention relates to locking and security devices. More specifically, the present invention relates to locking devices which may be used to lock sway control, weight distribution and other utility hitches for connecting vehicles, or to lock one object to another object, such as a spare tire to a motor vehicle.

BACKGROUND OF THE INVENTION

Various types of locking devices have been designed for a multitude of purposes. U.S. Pat. No. 3,605,457 to Foster and U.S. Pat. No. 3,139,291 to Geresy disclose trailer hitch locking devices which are used to lock a trailer hitch tongue to the ball of a conventional type of trailer hitch. Another type of device called a coupler lock has been used for locking together the central member and outer member of telescoping type utility hitches. In this type of utility hitch, the smaller central member fits telescopically into an outer member. Apertures through both members may be aligned so that a pin may be inserted therethrough to hold the central member within the outer member. If the pin is not locked onto these members in some manner it may be removed, and the vehicle which was connected to the hitch member, such as a trailer, could be stolen.

Other types of locking devices have been designed for securing attachments and accessories to vehicles. U.S. Pat. No. 1,828,658 to Henke, Jr. discloses an antitheft tire lock which utilizes band sections which wrap around a portion of the tire. U.S. Pat. No. 1,491,691 to Godshalk and U.S. Pat. No. 1,444,214 to Shultz disclose automobile spare tire locks utilizing a holding mechanism which presses against the tire rim to prevent removal of the spare tire from the vehicle. Spare tires for vehicles generally are mounted to racks affixed to the vehicle Since tires almost uniformly have stud holes for operably connecting the tires with studs to the vehicle, it would be desirable to use the stud holes in a tire in combination with the tire rack to lock the spare tire to the vehicle.

An improved locking device which can be used for the purposes described above is shown in U.S. Pat. No. 4,711,106 to Johnson. This device includes a stud having a threaded axial hole extending rearwardly from the forward end thereof and a keyed portion having at least one key, and a knob which locks over a forward position of the stud and includes a casing with an inner surface including at least one keyway each of which receives the corresponding key on the stud to prevent rotation of the casing with respect to the stud. The knob also includes a tumbler housing which is mounted in an axially fixed position within the casing to rotate freely when a key is inserted into the tumbler housing and to remain locked in a fixed position when the key is withdrawn.

SUMMARY OF THE INVENTION

The locking device of the present invention includes a stud having a first threaded surface and at least one flat face cut through the first threaded surface parallel to the axial direction of the stud. The locking device also includes a knob which locks over a forward section of the stud, the knob including a casing having an inner surface which defines a hole extending axially through the casing, at least one keyway extending axially through a forward section of the casing, and at least one flat surface extending axially through an extreme rearward section of the inner casing surface such that when the knob is placed over the forward section of the stud, each flat surface receives a corresponding flat face on the stud to prevent rotation of the casing with respect to the stud. The knob also includes a tumbler housing which is mounted in an axially-fixed position within a forward section of the casing hole so as to rotate freely when a key is inserted into a keyhole in the tumbler housing and be locked in a fixed position when the key is withdrawn. The knob also includes a second threaded surface on the internal bore of a sleeve which is fitted into a rearward end of the tumbler housing such that, when the knob is placed over the forward section of the stud, so that the stud extends partly into a rearward section of the casing hole, rotation of the tumbler housing in one direction with the key causes the second threaded surface of the sleeve to engage the first threaded surface so that the forward section of the stud is drawn into the rearward section of the casing hole.

The stud of the locking device is preferably comprised of two parts. First, the stud preferably includes a rod portion having the first threaded surface on the forward section of the rod. Second, the stud of the locking device preferably includes an expanded head which is integrally connected to and located rearwardly of the rod, the expanded head being of a larger diameter than the rod and being similar in external form to the knob.

In the preferred embodiment of the locking device, the stud has an axially oriented male-threaded portion extending rearwardly from the forward end of the stud which forms the first threaded surface, and the knob includes a sleeve having a threaded axial hole to form the second threaded surface. The sleeve has a rounded collar with a squared head attached to the collar's forward end which snugly fits into a squared recess at the rearward end of the tumbler housing. Therefore, when a key is placed in the key hole at the forward end of the tumbler housing and rotated, the tumbler housing is rotated thus causing the sleeve to rotate. The inner surface of the casing defines a collar retaining shelf which is faced in a forward direction and which is located adjacently rearward of the rounded collar of the sleeve when the squared head of the collar is fitted into the squared recess at the rearward end of the tumbler housing. The collar retaining shelf restrains the sleeve against any rearward movement thereof and divides the casing hole into a rearward and a forward section. The extreme rearward section of the inner casing surface has at least one flat surface where the forward section of the rod of the stud is inserted, which receives each corresponding flat face on the rod. When the forward section of the rod of the stud is inserted partially into the rearward section of the casing hole, the key may be used to turn the tumbler housing and fitted screw to thereby pull the forward section of the rod of the stud into the rearward section of the casing hole by engaging the male-threaded portion of the rod of the stud. As the forward section of the stud is pulled into the casing hole, the flat face on the rod of the stud slides forwardly over the flat surface of the extreme rearward section of the inner casing surface so as to prevent rotation of the stud and knob with respect to each other as the forward section of the stud moves into the casing hole and rests therewithin. Withdrawing the key from the tumbler housing allows slide tumblers to extend partially out from the tumbler housing into a keyway on the inner casing surface with which the slide tumblers are aligned, thereby locking the knob over the stud. Preferably, the forward portion of the inner casing surface has four axially oriented keyways 90° apart so that the key may be removed every quarter turn.

When the stud includes an expanded head on the end of the rod opposite the knob, the locking device may be used as a locking hitch pin for utility hitches which have telescoping central and outer members. The rod may be inserted to extend through the aligned apertures in the telescoping hitching members, to thereby lock the central member within the larger outer member. This preferred embodiment of the locking device may be used to lock such hitching members together even when the central member is solid instead of hollow. The expanded head at one end of the stud and the knob at the other end of the locking hitch pin maintain the locking hitch pin within the aligned apertures of the hitching members, so that the locking hitch pin cannot be removed without a key. The locking hitch pin may also be used to lock a spare tire to the rack on which it is mounted to a vehicle. The rod of the stud can be inserted through a hole bored in the rack, then through one of the stud holes in the tire. The knob can then be locked over the forward section of the stud to lock the tire in place.

In the preferred locking device, both the collar of the sleeve and the collar retaining shelf are made of steel. If someone should try to force the locking device open by pulling the device apart, this steel against steel construction can withstand more force than the zinc against steel construction of many other locking devices. The preferred locking device includes a two-piece internal mechanism in the knob as opposed to a one-piece internal mechanism and, thus, eliminates the extra assembly time required for connecting the sleeve to the tumbler housing. For example, by fitting the squared sleeve head into the squared recess of the tumbler housing instead of permanently connecting this sleeve and tumbler housing together, the preferred locking device eliminates the need to connect the sleeve and tumbler housing together by such means as threading a hole in the tumbler housing and threadably inserting the sleeve into the tumbler housing. The separate sleeve also can be made with an internal threaded bore of various sizes, to accommodate studs of various sizes, without requiring a modification of other parts of the knob.

Further objects, features and advantages of the invention will be apparent from the following detailed description taken in conjunction with the accompanying drawings.

DESCRIPTION OF THE PREFERRED EMBODIMENT

Figure 1:
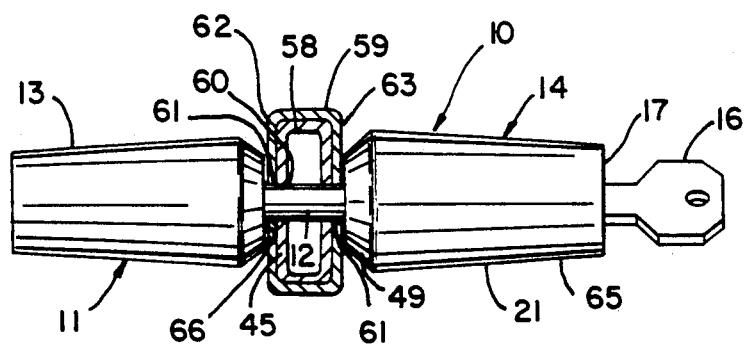
FIG. 1 is a side view of a locking hitch pin according to the present invention, shown illustratively inserted into the aligned apertures of two telescoping hitching members which are shown in cross section.
Figure 2:
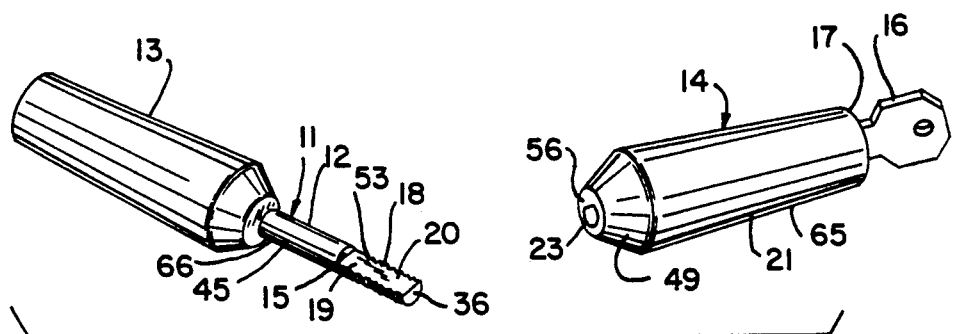
FIG. 2 is a perspective view of the locking hitch pin of FIG. 1, with the stud and knob separated from each other.

Referring more particularly to the drawings, wherein like numbers refer to like parts, FIGS. 1 and 2 show a preferred locking device 10 which is embodied as a locking hitch pin, including a stud 11 having a rod portion 12 and an expanded head 13, and a knob 14 with a locking key 16 inserted in the forward end 17 thereof. FIG. 1 shows the knob 14 locked onto the rod 12 of the stud 11, and FIG. 2 shows the knob 14 separated from the rod, exposing the forward section 18 of the stud 11 onto which the knob 14 locks. As shown in FIG. 2, the rod includes an axially oriented male-threaded portion 19 extending rearwardly from the forward end 36 of the rod which forms a first threaded surface of the locking hitch pin 10. When the knob 14 is locked over the forward section 18 of the rod 11, the male-threaded portion 19 is entirely contained within the knob 14. The forward section 18 has at least one flat face 20 parallel to the axial direction of the rod 12, and extending rearwardly from the forward end 36 of the rod 12 and creating a rod junction 15 where the flat face 20 abruptly ends. The rod junction 15 is perpendicular to the axial direction of the rod 12.

Figure 3:
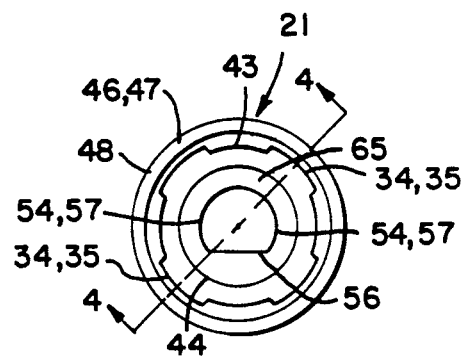
FIG. 3 is a front view of the knob casing without the two-piece internal mechanism shown in FIGS. 4 and 5.

The knob 14 includes a tapered cylindrical casing 21 and an internal mechanism 22 enclosed within a hole 23 extending axially through the casing 21, the hole 23 being defined by the inner surface 24 of the casing 21. The extreme rearward section 57 of the inner surface 24 of the casing 21 has at least one flat surface 56 where the forward end 36 of the rod 12 is inserted. There are the same number of flat surfaces 56 as there are flat faces 20 on the rod 12 of the stud 11. Each flat surface 56 is adapted to receive a corresponding flat face 20 on the rod 12 of the stud 11 when the forward end 36 of the stud 11 is inserted into the casing hole 23. In the locking device 10 shown in FIGS. 2–4, the rod 12 has one flat face 20 and the inner surface 24 of the casing 21 has one flat surface 56. FIGS. 2 and 3 show the locking device 10 with only one flat surface 56 and FIG. 2 shows the corresponding flat face 20. When the flat face 20 receives and abuts the flat surface 56, the knob 14 and the stud 11 are prevented from rotating relative to one another. To prevent rotation of the knob 14 and stud 11 with respect to each other while allowing the knob 14 and stud 11 to slide axially with respect to each other, the flat face 20 and the flat surface 56 are formed parallel to a central axis through the knob 14 and stud 11.

Figure 7:
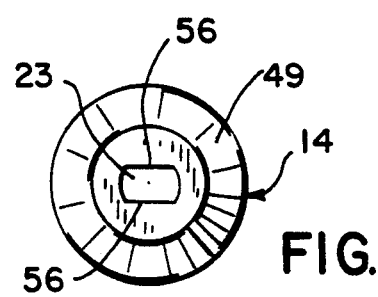
FIG. 7 is an end view of a modified embodiment of the knob having two flat surfaces on the inner surface of the hole therein which receives the rod.
Figure 8:
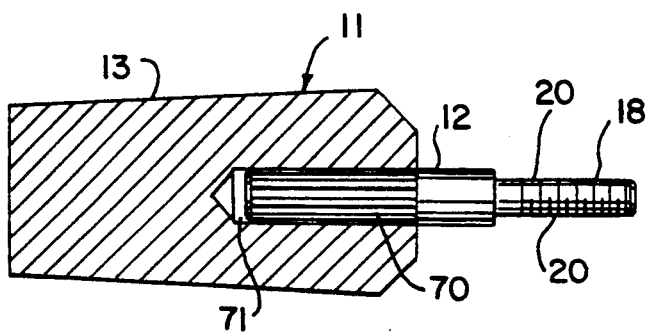
FIG. 8 is a partial cross-sectional view of a stud having a rod adapted to mate with the tumbler housing of FIG. 7.
Figure 9:
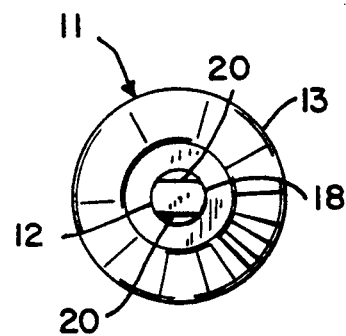
FIG. 9 is a plan view of the end of the stud of FIG. 8.

FIG. 7 shows an end view of a modified knob which has two parallel flat surfaces 56. These flat surfaces abut with two flat faces on a rod as shown in FIGS. 8-10 and described further below.

Figure 4:
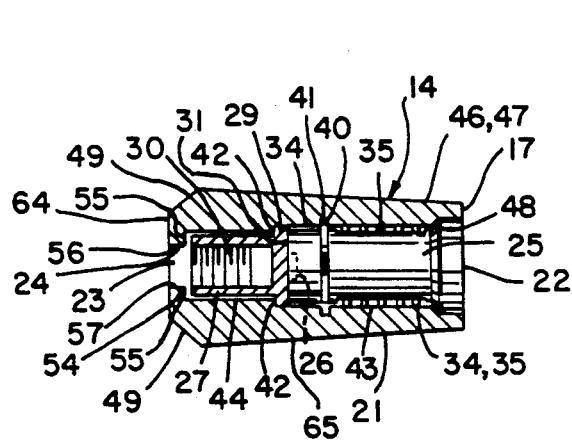
FIG. 4 is a section view taken along 4—4 of FIG. 3 but including the two-piece internal mechanism, showing the tumbler housing and sleeve within the sectioned casing.
Figure 5:
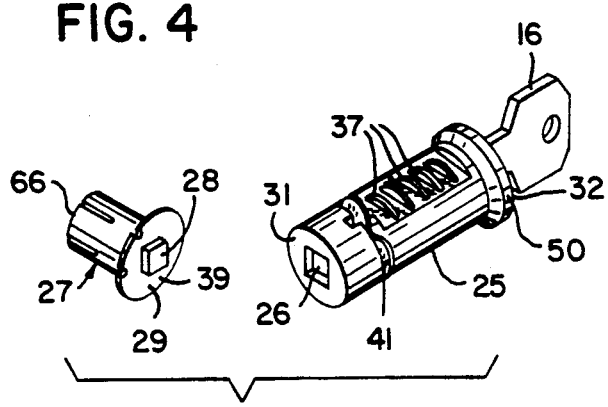
FIG. 5 is a perspective view of the two piece internal mechanism of FIG. 4, with the tumbler housing and sleeve separated from each other. The squared head of the sleeve fits into the squared recess at the rearward end of the tumbler housing, and a key is inserted into the tumbler housing keyhole.
Figure 6:
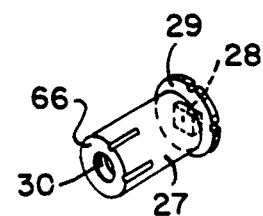
FIG. 6 is a perspective view of the sleeve, but taken from the opposite perspective as the sleeve appears in FIG. 5.

As shown in FIGS. 4 and 5, the internal mechanism 22 of the knob 14 includes a tumbler housing 25 and an axially oriented internal threaded sleeve 27 which is fitted into the rearward end 31 of the tumbler housing 25. The sleeve 27 has a threaded hole or bore 30 which forms a second threaded surface of the locking hitch pin 10. In the preferred knob 14, the sleeve 27 has a squared head 28 adapted to fit in a squared recess 26 at the rearward end 31 of the tumbler housing 25. Also, the sleeve 27 has a rounded collar 29 which abuts against a collar retaining shelf 42 to maintain the sleeve 27 in its position extended axially from the rearward end 31 of the tumbler housing 25. At the forward end 32 of the tumbler housing 25 is a keyhole (not shown) into which the key 16 may be inserted. The tumbler housing 25 includes slide tumblers 37, operable by the locking key 16 which are substantially entirely contained in the tumbler housing 25 when the key 16 is fully inserted into the keyhole. When the key 16 is withdrawn, the slide tumblers 37 are biased to extend partially outside of the tumbler housing 25 into one of four axially oriented keyways 35 located 90° apart when aligned therewith to prevent the tumbler housing 25 from rotating. Since there are four keyways 35 on the forward portion 34 of the inner casing surface 24, the tumbler housing 25 can lock into a fixed rotational position every quarter turn of the key 16.

In the preferred locking hitch pin 10, the inner surface 24 of the casing 21 also has an annular groove 40 as shown in FIG. 4. The tumbler housing 25 includes a catch ring 41 which is biased to extend radially outwardly from the tumbler housing 25 as shown in FIGS. 4 and 5. This biasing of the catch ring 41 causes the ring 41 to extend from the tumbler housing 25 into the annular grove 40 to maintain the tumbler housing 25 in its axially fixed position. As the tumbler housing 25 is turned by the key 16, the catch ring 41 maintains its position within the annular groove 40 so that the tumbler housing 25 can neither move forwardly nor rearwardly from its position. Additionally, the inner surface 24 of the casing 21 has the collar retaining shelf 42 which is located adjacently rearward of the rounded collar 29 of the sleeve 27 as shown in FIG. 4. The position of the collar retaining shelf 42 should be such that when the rounded collar 29 of the sleeve 27 abuts against the shelf 42, the forward end 39 of the rounded collar 29 touches the rearward end 31 of the tumbler housing 25. The collar retaining shelf 42 thereby restrains the sleeve 27 against any rearward movement thereof, as shown in FIG. 4, and also causes the squared head 28 of the rounded collar 29 to fit entirely within the squared recess 26 at the rearward end 31 of the tumbler housing 25. In the preferred locking hitch pin 10, this collar retaining shelf 42 within the casing hole 23 divides the hole 23 into a forward section 43 where the tumbler housing 25 fits, and a rearward section 44 into which the sleeve 27 extends and which is adapted to receive the forward section 18 of the rod 12 of the stud 11.

The forward end 46 of the casing hole 23 is preferably widened to form a forward sheath 47 and a radial retention surface 48 which faces in a forward direction. A forward end 32 of the tumbler housing 25 is also widened to form a flange 50 which has an outside diameter which is slightly smaller than the inside diameter of the forward sheath 47 when the tumbler housing 25 is properly positioned within the forward section 43 of the casing hole 23. The fit must not be so tight that the tumbler housing 25 cannot rotate within the casing hole 23. When the flange 50 is seated within the forward sheath 47, the flange 50 should obscure the keyways 35 and the casing hole 23 so that they cannot be pried. In order for the keyways 35 to be obscured, they cannot extend into the forward sheath 47. Therefore, the forward end 46 of the casing hole 23 which forms the forward sheath 47 must be widened to an extent which is at least as far outward radially as the radially outermost extent of the keyways 35, i.e., that point within the keyways 35 which is radially furthest from the central axis of the casing 21 and casing hole 23. The forward sheath 47 should extend rearwardly within the casing hole 23 to a point where the radially retention surface 48 abuts against the flange 50 to provide further restraint against the tumbler housing 25 moving rearwardly, but such that the forward end 32 of the tumbler housing 25 is flush with the forward end 17 of the knob 14.

The rearward end 54 of the casing hole 23 is also preferably narrowed abruptly so that the extreme rearward section 57 of the inner casing surface 24 is adapted to receive the forward end 36 of the rod 12 of the stud 11 when the forward section 18 of the rod 12 is fully inserted within the rearward section 44 of the casing hole 23. A rearward retaining shelf 55 located adjacent to the rearward end 66 of the sleeve 27 is formed where the casing hole 23 abruptly narrows. The rearward retaining shelf 55 provides further restraint against the sleeve 2 moving rearwardly. The forward section 18 of the rod 12 therefore preferably has an outer diameter which is slightly smaller than the inside diameter of the rearward end 54 of the casing hole 23 so that a rearward portion 53 of the forward section 18 of the rod 12 which is not drawn into the threaded axial hole 30 of the sleeve 27, but is still positioned within the rearward end 54 of the casing hole 23, seats snugly within the rearward end 54 when the forward section 18 of the rod 12 is drawn entirely into the rearward section 44 of the casing hole 23. In addition, the extreme rearward section 57 of the inner casing surface 24 has at least one flat surface 56 which is adapted to receive the corresponding flat face 20 on the rod 12 of the stud 11. The rod 12 should be drawn into the casing hole 23 as far as the rod junction 15 on the rod 12, i.e., to that point on the rod 12 where the flat face 20 abruptly ends. At this point, the rod junction 15 separates the rod 12 into two parts: a perfectly cylindrical rearward section 45 of the rod 12 and the mostly cylindrical forward section 18 of the rod 12. When the rod 12 is fully inserted into the casing hole 23, the rod junction 15 abuts against the rearward surface 64 of the casing 21, thereby preventing the rod 12 from being drawn into the hole 23 any further. Since the rearward portion 53 of the forward section 18 of the rod 12 seats snugly within the rearward end 54 of the casing hole 23, the casing hole 23 may not be pried from the outside. The rearward end 49 of the casing 21 is tapered rearwardly and radially inwardly to the rearward end 54 of the casing hole 23, so that when the forward section 18 of the rod 12 of the stud 11 is drawn into the rearward section 44 of the casing hole 23, the tapered rearward end 49 of the casing 21 inhibits use of that end to pry the knob 14 away from the stud 11. In addition, the forward end 65 of the casing 21 is tapered forwardly and radially inwardly to the forward end 17 of the knob 14 so as to prevent someone from prying the lock 10 open with a wrench by either prying the knob 14 away from the stud 11 or twisting the knob 14 in the opposite direction relative to the stud 11.

The locking device 10 as shown in FIGS. 1 through 6 is an exemplification of the invention, and is not intended to limit the embodiments of the invention to that shown. The rearward section 45 of the rod 12 of the stud 11 may vary both in length and diameter, and the stud 11 need not include an expanded head 13. Although the rearward section 45 of the rod 12 shown in FIG. 1 is a rod portion which is integrally connected to and located rearwardly of the forward section 18 of the rod 12, alternatively the rearward section 45 even could be so short as to not resemble a rod. For example, in one embodiment, the locking device can be used for locking and holding a panel cover to an electrical control box. In such a case, the stud 11 would have no expanded head 13, and the rearward section 45 might be very short and connected by its rearward end 66 to the control box by a weld. Such an electrical control box could have a plurality of these locking devices for locking and holding a cover panel therein. The cover panel would have holes that would receive the rearward sections 45 of the studs 11 when the cover panel is placed over the electrical control box opening. After the cover panel is properly placed, the knob 14 can then be locked over the studs 11 to hold and lock the cover panel to the control box. In another embodiment, a shorter version of the locking hitch pin 10 shown in FIG. 1 could be used for locking spare tires to the rack in which they are placed on the motor vehicle. The locking device also could be used for locking scaffolding together and for locking various other types of equipment and apparatus together.

The forward section 18 of the rod 12 of the stud 11 need not include only one flat face 20. In another embodiment as shown in FIGS. 8 and 9, two flat faces 20 may be cut into opposite sides of the rod 12 such that the two faces of 20 are parallel both to each other and to the axial direction of the rod 12 of the stud 11. Two corresponding flat surfaces 56 at the extreme rearward section 57 of the inner casing surface 24 are formed as illustrated in FIG. 7.

The rod 12 may be formed separately from the head 13 of the stud 11. The rod 12 may include a knurled rear portion 70 which can be tightly press-fit into a hole 71 in the head 13, as shown in FIG. 8.

The locking device 10 is intended to be used for locking two or more pieces of equipment, apparatus, or objects together, such as a trailer to a towing vehicle. When used with a weight distribution hitch, sway control trailer hitch or a Hi-Lo Utility hitch, before attempting to insert the stud 11 the user should make sure that the central member 58 of the hitch is properly inserted in the outer member 59 so that the apertures 60 and 61 in these members are properly aligned with one another, as shown in FIG. 1. The stud 11 may then be inserted into the apertures 60 and 61 so that the forward section 18 of the rod 12 of the stud 11 extends out from the apertures 60 and 61 to the side 63 opposite to that side 62 in which the stud 11 was inserted. While holding the stud 11 by its expanded head 13 so the stud 11 does not come out of the apertures 60 and 61, the user may place the knob 14 over the forward section 18, so that the forward section 18 of the stud 11 extends partly into the rearward section 44 of the casing hole 23. As the key 16 is turned clockwise, only the tumbler housing 25 and the sleeve 27 which comprise the internal mechanism 22 rotate within the casing 21. Neither the casing 21 nor the stud 11 rotate as the key 16 is turned. Every quarter turn of the key 16 causes the slide tumblers 37 to be aligned with one of the four keyways 35 within the casing hole 23. When so aligned, the key 16 may be withdrawn and the tumbler housing 25 locked into position. Without the key 16, the knob 14 cannot be removed from the stud 11. Reinserting the key 16 and turning the key 16 counter-clockwise until the male-threaded portion 19 of the rod 12 and the threaded axial hole 30 of the sleeve 27 disengage removes the knob 14 from the stud 11. In other applications of the present invention, the knob 14 may lock to the stud 11 in much the same manner as described above.

The locking hitch pin 10 shown in FIG. 1 may also be used with trailer hitching systems where the central member 58 is solid instead of hollow. Once in place, the locking hitch pin 10 according to the present invention is very difficult to pry open or to otherwise improperly remove. All surfaces on the locking device which might be vulnerable to prying are obscured or tapered to remove prying or pivoting points.

It is understood that the present invention is not limited to the particular embodiments and arrangement of the parts disclosed and illustrated herein, but embraces all such modified forms thereof as come within the scope of the following claims.

What is claimed is:

1. A locking device comprising:
    a) a stud including a first threaded surface on a forward section of the stud and at least one flat face cut through the first threaded surface forming a plane parallel to the axial direction of the stud; and
    b) a knob which locks over the forward section of the stud, including
        i) a casing having an inner surface which defines a hole, and at least one flat surface extending axially through an extreme rearward section of the inner casing surface, such that when the knob is placed over the forward section of the stud, each flat surface on the casing receives the corresponding flat face of the stud to prevent rotation of the casing with respect to the stud;
        ii) a tumbler housing which is mounted for rotation in an axially fixed position within the forward section of the casing hole, and means for selectively locking the tumbler housing to prevent rotation of the housing within the casing while permitting rotation when unlocked; and
        iii) a second threaded surface in a rearward end of the tumbler housing such that when the knob is placed over the forward section of the stud, rotation of the tumbler housing in one direction causes the second threaded surface to engage the first threaded surface of the stud so that the forward section of the stud is drawn into the rearward section of the casing hole.

2. The locking device of claim 1 wherein the inner surface of the casing further includes a larger annular groove, and wherein the tumbler housing includes a catch ring which is biased to extend radially outwardly from the tumbler housing into the larger annular groove to maintain the tumbler housing in its axially fixed position.

3. The locking device of claim 1 wherein the knob includes an axially oriented sleeve having a rounded collar and a threaded internal bore forming the second threaded surface; and wherein the inner surface of the casing defines a collar retaining shelf which is faced in a forward direction and which is located adjacently rearward of the rounded collar of the sleeve when the forward end of the collar touches the rearward end of the tumbler housing, so as to restrain the sleeve against any rearward movement thereof and to divide the hole into a rearward and a forward section.

4. The locking device of claim 1 wherein the casing includes at least one keyway extending axially through a forward section of the casing and the means for selectively locking the tumbler housing includes a plurality of locking key operated slide tumblers which are contained within the housing to permit rotation of the housing when a key is engaged with the tumblers and which otherwise extend out of the housing into the keyway to prevent rotation of the housing.

5. A locking device comprising:
a) a stud including a first threaded surface on a forward section of the stud and at least one flat face cut through the first threaded surface forming a plane parallel to the axial direction of the stud; and
b) a knob which locks over the forward section of the stud, including
  i) a casing having an inner surface which defines a hole, at least one keyway extending axially through a forward section of the casing, and at least one flat surface extending axially through an extreme rearward section of the inner casing surface, such that when the knob is placed over the forward section of the stud, each flat surface receives the corresponding flat face of the stud to prevent rotation of the casing with respect to the stud;
  ii) a tumbler housing which is mounted in an axially fixed position within the forward section of the casing hole to rotate freely when a key is inserted in a keyhole in the tumbler housing, and to remain locked in a fixed position when the key is withdrawn; and
  iii) a second threaded surface in a rearward end of the tumbler housing such that when the knob is placed over the forward section of the stud so that the stud extends partly into a rearward section of the casing hole, rotation of the tumbler housing in one direction causes the second threaded surface to engage the first threaded surface so that the forward section of the stud is drawn into the rearward section of the casing hole;

wherein a forward end of the casing hole is widened at least as far radially outward as the radially outermost extent of the at least one keyway to form a forward sheath in which a keyway is absent and a radial retention surface which faces in a forward direction; and wherein a forward end of the tumbler housing is widened to form a flange which has an outside diameter slightly less than an inside diameter of the forward sheath, so that when the tumbler housing is positioned in the casing hole, the flange fits snugly within the forward sheath to obscure the keyway and casing hole, and the radial retention surface abuts against the flange to restrain the tumbler housing from rearward movement.

6. A locking device comprising:
a) a stud including a first threaded surface on a forward section of the stud and at least one flat face cut through the first threaded surface forming a plane parallel to the axial direction of the stud; and
b) a knob which locks over the forward section of the stud, including
  i) a casing having an inner surface which defines a hole, at least one keyway extending axially through a forward section of the casing, and at least one flat surface extending axially through an extreme rearward section of the inner casing surface, such that when the knob is placed over the forward section of the stud, each flat surface receives the corresponding flat face of the stud to prevent rotation of the casing with respect to the stud;
  ii) a tumbler housing which is mounted in an axially fixed position within the forward section of the casing hole to rotate freely when a key is inserted into a keyhole in the tumbler housing, and to remain locked in a fixed position when the key is withdrawn; and
  iii) a second threaded surface in a rearward end of the tumbler housing such that when the knob is placed over the forward section of the stud so that the stud extends partly into a rearward section of the casing hole, rotation of the tumbler housing in one direction causes the second threaded surface to engage the first threaded surface so that the forward section of the stud is drawn into the rearward section of the casing hole;

wherein the rearward end of the casing hole is narrowed abruptly such that the inside diameter of the rearward end is slightly greater than the outer diameter of the forward section of the stud so that when the forward section of the stud is drawn into the rearward section of the casing hole, a rearward portion of the forward section of the stud seats snugly within the rearward end of the casing hole and obscures the casing hole.

7. The locking device of claim 6 wherein the forward section of the inner surface of the casing defines four axially oriented keyways about 90° apart for receiving locking key operated slide tumblers within the tumbler housing.

8. The locking device of claim 6 wherein the stud has an axially oriented male-threaded portion which forms the first threaded surface; and the knob includes an axially oriented sleeve, having a threaded bore, which is fitted into the rearward end of the tumbler housing with its threaded bore forming the second threaded surface.

9. The locking device of claim 6 wherein a rearward end of the casing is tapered rearwardly and radially inwardly to the rearward end of the casing hole, so that when the forward section of the stud is drawn into the rearward section of the casing hole, the knob lacks any surface which could easily be used to pry the knob from the stud.

10. The locking device of claim 6 wherein the forward end of the casing is tapered forwardly and radially inwardly to the forward end of the casing hole, so that when the forward section of the stud is drawn into the rearward section of the casing hole, wrench can not easily be used to break the locking device open by either prying the knob away from the stud or by twisting the knob in an opposite direction with respect to the stud.

11. The locking device of claim 6 wherein the stud comprises a rod having the first threaded surface extending rearwardly from the forward end of the rod and having the flat face on the forward section of the rod, and wherein the forward section of the rod has an outer diameter which is slightly smaller than the inside diameter of the rearward end of the casing hole.

12. The locking device of claim 11 wherein the stud further includes an expanded head which is integrally connected to and located rearwardly of the rod, the expanded head being of larger diameter than the rod and being similar in external form to the knob.

13. A locking hitch pin, comprising:
   a) a stud including
      i) a rod portion having a forward section with an axially oriented male-threaded portion extending rearwardly from the forward end of the rod and at least one flat face on the forward section which extends rearwardly from the forward end of the rod and forms a plane parallel to the axial direction of the rod; and
      ii) an expanded head which is integrally connected to and located rearwardly of the rod;
   b) a knob which locks over the forward section of the rod of the stud, the knob including
      i) a casing having an inner surface which defines a hole extending axially through the casing, at least one keyway extending axially through a forward section of the casing, and at least one flat surface extending axially through an extreme rearward section of the inner casing surface such that when the knob is placed over the forward section of the rod of the stud, each flat surface receives the corresponding flat face on the rod to prevent rotation of the casing with respect to the stud;
      ii) an internal mechanism which is rotatably mounted within the casing hole in an axially fixed position, the internal mechanism including a sleeve having a threaded hole extending axially rearwardly so that when the forward section of the rod of the stud is inserted into the casing hole and the internal mechanism is rotated, the threaded axial hole engages the male-threaded portion of the rod to draw the forward section of the rod of the stud into a rearward section of the casing hole; and
   c) a means for locking the forward section of the rod of the stud in the casing hole;
   wherein a forward end of the casing hole is widened at least as far radially outward as the radially outermost extent of the at least one keyway to form a forward sheath in which a keyway is absent, and a radial retention surface which faces in a forward direction; and
   wherein a forward end of the internal mechanism is widened to form a flange which has an outside diameter slightly smaller than an inside diameter of the forward sheath, so that when the internal mechanism is properly positioned within the casing hole, the flange fits snugly within the forward sheath to obscure at least one keyway and the casing hole, and the radial retention surface abuts against the flange to restrain the internal mechanism from rearward movement.

14. A locking hitch pin, comprising:
   a) a stud including
      i) a rod portion having a forward section with an axially oriented male-threaded portion extending rearwardly from the forward end of the rod and at least one flat face on the forward section which extends rearwardly from the forward end of the rod and forms a plane parallel to the axial direction of the rod; and
      ii) an expanded head which is integrally connected to and located rearwardly of the rod;
   b) a knob which locks over the forward section of the rod of the stud, the knob including
      i) a casing having an inner surface which defines a hole extending axially through the casing, at least one keyway extending axially through a forward section of the casing, and at least one flat surface extending axially through an extreme rearward section of the inner casing surface such that when the knob is placed over the forward section of the rod of the stud, each flat surface receives the corresponding flat face on the rod to prevent rotation of the casing with respect to the stud;
      ii) an internal mechanism which is rotatably mounted within the casing hole in an axially fixed position the internal mechanism including a threaded hole extending axially rearwardly so that when the forward section of the rod of the stud is inserted into the casing hole and the internal mechanism is rotated, the threaded axial hole engages the male-threaded portion of the rod to draw the forward section of the rod of the stud into a rearward section of the casing hole; and
   c) means for locking the forward section of the rod of the stud in the casing hole;
   wherein the rearward end of the casing hole is narrowed abruptly such that the inside diameter of the rearward end is slightly greater than the outer diameter of the forward section of the rod of the stud so that when the forward section of the rod is drawn into the rearward section of the casing hole, a rearward portion of the forward section of the rod seats snugly within the rearward end of the casing hole and obscures the casing hole.

15. A locking hitch pin, comprising:
   a) a stud including
      i) a rod portion having a forward section with an axially oriented male-threaded portion extending rearwardly from the rearward end of the rod and at least one flat face on the forward section which extends rearwardly from the forward end of the rod and forms a plane parallel to the axial direction of the rod; and
      ii) an expanded head which is integrally connected to and located rearwardly of the rod;
   b) a knob which locks over the forward section of the stud, the knob including a casing having an inner surface defining a hole therethrough;
   c) two engaging threaded surfaces, one on the rod of the stud and one on the knob, such that when the knob is placed over the forward section of the rod so that the rod extends partly into a rearward section of the casing hole, one of the threaded surfaces can be turned to engage the other threaded surface and pull the forward section of the rod of the stud into the rearward section of the casing hole;

d) means for locking the forward section of the rod of the stud within the rearward section of the casing hole;

wherein the threaded surface on the rod of the stud is defined by an axially oriented male-threaded portion extending rearwardly from the forward end of the rod of the stud;

wherein the knob further includes a two-piece internal mechanism comprising i) a tumbler housing which is rotatably mounted within the casing hole in an axially fixed position; and ii) an axially oriented sleeve fitted into the rearward end of the tumbler housing so that rotation of the tumbler housing causes the fitted sleeve to rotate, the sleeve having a threaded hole facing the rearward direction which extends axially rearwardly from the rearward end of the tumbler housing and forms the threaded surface on the knob;

wherein the inner surface of the casing defines at least one flat surface extending axially through an extreme rearward section of the inner casing surface which is sized to receive the corresponding at least one flat face on the rod of the stud when the forward section of the rod moves into the casing hole and rests therewithin, each flat face and flat surface sitting opposite one another to prevent rotation of the knob with respect to the stud;

wherein a forward end of the casing hole is widened radially outward to form a forward sheath, and a radial retention surface which faces a forward direction; and wherein a forward end of the tumbler housing is widened to form a flange which has an outside diameter slightly less than an inside diameter of the forward sheath, so that when the tumbler housing is properly positioned within the casing hole, the flange fits snugly within the forward sheath to obscure the casing hole, and the radial retention surface abuts against the flange to restrain the tumbler housing from rearward movement.

16. A locking hitch pin, comprising:

a) a stud including i) a rod portion having a forward section with an axially oriented male-threaded portion extending rearwardly from the forward end of the rod and at least one flat face on the forward section which extends rearwardly from the forward end of the rod and forms a plane parallel to the axial direction of the rod; and ii) an expanded head which is integrally connected to and located rearwardly of the rod;

b) a knob which locks over the forward section of the stud, the knob including a casing having an inner surface defining a hole therethrough;

c) two engaging threaded surfaces, one on the rod of the stud and one on the knob, such that when the knob is placed over the forward section of the rod so that the rod extends partly into a rearward section of the casing hole, one of the threaded surfaces can be turned to engage the other threaded surface and pull the forward section of the rod of the stud into the rearward section of the casing hole;

d) means for locking the forward section of the rod of the stud within the rearward section of the casing hole;

wherein the threaded surface on the rod of the stud is defined by an axially oriented male-threaded portion extending rearwardly from the forward end of the rod of the stud;

wherein the knob further includes a two-piece internal mechanism comprising i) a tumbler housing which is rotatably mounted within the casing hole in an axially fixed position; and ii) an axially oriented sleeve fitted into the rearward end of the tumbler housing so that rotation of the tumbler housing causes the fitted sleeve to rotate, the sleeve having a threaded hole facing the rearward direction which extends axially rearwardly from the rearward end of the tumbler housing and forms the threaded surface on the knob;

wherein the inner surface of the casing defines at least one flat surface extending axially through an extreme rearward section of the inner casing surface which is sized to receive the corresponding at least one flat face on the rod of the stud when the forward section of the rod moves into the casing hole and rests therewithin, each flat face and flat surface sitting opposite one another to prevent rotation of the knob with respect to the stud; and wherein the rearward end of the casing hole is narrowed abruptly such that the inside diameter of the rearward end is slightly greater than the outer diameter of the forward section of the rod of the stud so that when the forward section of the rod is drawn into the rearward section of the casing hole, a rearward portion of the forward section of the stud seats snugly within the rearward end of the casing hole and obscures the casing hole.

* * * * *